UNITED STATES PATENT OFFICE.

HENRY A. KOHMAN, TRUMAN M. GODFREY, AND LAUREN H. ASHE, OF PITTSBURGH, PENNSYLVANIA, ASSIGNORS TO WARD BAKING COMPANY, OF NEW YORK, N. Y., A CORPORATION OF NEW YORK.

METHOD OF COMMINUTING HARD FATS.

1,323,367.  Specification of Letters Patent.  Patented Dec. 2, 1919.

No Drawing.  Application filed March 21, 1916. Serial No. 85,672.

*To all whom it may concern:*

Be it known that we, HENRY A. KOHMAN, TRUMAN M. GODFREY, and LAUREN H. ASHE, all citizens of the United States, residing at Pittsburgh, Allegheny county, State of Pennsylvania, have invented certain new and useful Improvements in Methods of Comminuting Hard Fats; and we do hereby declare the following to be a full, clear, and exact description of the invention, such as will enable others skilled in the art to which it appertains, to make and use the same.

This invention relates to the preparation of a pulverulent fat of high melting point adapted for use as a shortening agent in the manufacture of leavened bread and for food products where shortening agents of the nature indicated are desirable.

In the manufacture of leavened bread, it is customary to incorporate with the flour, yeast, salt, water, milk, and like ingredients of the dough batch, an appropriate quantity of a shortening agent, liquid at ordinary temperatures, and miscible therewith by the usual mixing and kneading apparatus employed in the trade.

The purpose of this shortening agent, as is well known, is to lessen the toughness of the baked loaf, to mature and age the dough so that its cell walls shall be of a finer, thinner texture, thereby contributing to whitening the loaf and contributing to homogeneity in the size and distribution of the cells in the finished product.

With the ordinary dough batch, however, it is impracticable to increase the amount of liquid shortening employed beyond well established limits without seriously hampering the bread-making operation and without sacrifice of qualities in the finished product of a highly desirable character. Thus, from the operating standpoint, the dough, instead of being soft and sticky, should be fairly stiff, so that it will not tend to clog the dividing and molding machines, and so that it will have the springiness recognized as desirable in the dividing and molding operations. To obtain this stiffness or springiness of the dough batch, an appropriate amount of water should be employed. It is found, however, that the employment of a liquid shortening agent (say a vegetable oil, such as cotton-seed oil or the like) materially cuts down the amount of water which the dough will tolerate, and lessens the desired springiness of the batch. Moreover, in the finished loaf, the proportion of water present is likewise diminished, with a corresponding sacrifice of the normal freshness and flavor of the bread. Furthermore, to produce the desired shortening effect for bread of high quality, the quantity of the liquid shortener employed, although limited by the considerations just referred to, is often relatively considerable,—amounting, even in ordinary practice, to from two to three per cent. by weight of the flour employed in making up the dough batch.

It has been commonly considered, heretofore, that hard fats of high melting point are of little or no value as shortening agents, and, so far as we are aware, such fats have not heretofore been successfully used by direct addition and incorporation with the dough batch or its constituents. In the use of shortening agents such as lard, butter, and other compositions of like nature and consistency, it is common practice to mix the lard or other shortening agent directly with the flour, the semi-solid and plastic nature of the lard making it possible to obtain in this way a sufficiently uniform and homogeneous distribution of the shortening agent. Such methods are precluded in the case of the solid fats of high melting point, which are too hard to permit of incorporation by mixing at ordinary temperatures.

We have, however, found that such hard fats of high melting point can, by the novel method of the present invention, be reduced to a fine powder of a sufficiently fine state of sub-division so that the resulting powder is available for use as a shortening agent, and so that this powder can be incorporated with the flour and other constituents of the dough batch to produce a homogeneous product.

We have found that, when the hard fat has been reduced to such a fine state of sub-division, the shortening effect produced by its use is equal in value to that produced by a much larger quantity of liquid oil. So also, the employment of the hard fat of a sufficiently fine state of sub-division is found to permit the use of sufficient water not only to supply the amount required for giving the desired stiffness and springiness to the dough, but to supply, in the baked loaf, the quantity recognized as desirable for imparting to the bread the expected freshness and flavor. The employment of the hard fat in the necessary fine state of subdivision as the shortening agent, is likewise found to add to the keeping qualities of the loaf, in the sense that, even after the loaf has lost its original freshness, it lacks the rancidity frequently met with in ordinary bread which has been kept under the same conditions for the same period of time.

The hard fat made use of in the novel process of the present invention and in the production of the novel product thereof may be either of vegetable or animal origin, as, for instance, hydrogenated edible vegetable oil (say, hydrogenated cotton-seed oil), hydrogenated edible animal oil, or oleostearin. In most instances, we prefer to use hydrogenated cotton-seed oil, or other hydrogenated vegetable oil of an edible character, for the reason that such hydrogenated oils are relatively cheap, and can be hydrogenated or hardened up to a high melting point readily and conveniently. Thus, cotton-seed oil, having a melting point of 57° C., is well adapted to the purposes of the invention, and may be instanced as illustrating its preferred practice.

Hard fats, such as those referred to above, are difficult to pulverize or comminute by common methods of mechanical grinding, inasmuch as, at ordinary room temperatures, and particularly in warm weather, the particles of the fat tend to stick together and coalesce. This coalescence and sticking together goes on during the grinding operation, thereby prejudicing the grinding or comminution.

According to the present invention, however, the hard fat can be reduced to a sufficiently fine state of subdivision, substantially without sticking together or coalescence of the particles, so that it can be incorporated with the dough batch, or with constituents of the dough batch, in a homogeneous manner.

In practising the process of the present invention, the hard fat is subjected to a grinding or mechanical comminution, but the fat is maintained at a temperature below that at which the particles coalesce. Thereby, the separated particles remain separated until the desired state of sub-division has been attained. In the preferred practice of the invention, the grinding operation is carried out in a ball mill, the temperature of which is suitably regulated so that the hard fat is kept below the temperature at which its particles will coalesce. This temperature will vary somewhat with the melting point of the hard fat. The ball mill may be of the ordinary type, the grinding operation being so regulated that the hard fat will be reduced to a fine powder.

We have thus reduced the hard fat to particles of a size which will readily pass through a 200 mesh sieve, although it is not essential that all of the particles should be reduced to this fineness, provided the coarser particles be removed at the end of the grinding operation. Such portions of the product as are of a sub-division sufficiently fine to pass through a sieve of about 200 mesh to the square inch will be homogeneously absorbed by the dough batch in the course of the mixing and kneading operation, or can be homogeneously admixed with the flour or other constituents of the dough batch. Accordingly, where the product as a whole has been reduced to such a state of sub-division, or when the coarser particles have been removed from the product in which a part only of the fat has been reduced to such a state, the comminuted product is available for use to advantage for shortening purposes. In general, it will not be desirable to attempt to incorporate in the dough batch particles of the fat of a size materially larger than will pass through a sieve of the mesh referred to, and, accordingly, such larger particles should, in general, be removed, so that the product will be available for use as a whole for shortening purposes.

It is found that, with equally good results as to color, texture, and expansion, a quantity of the pulverulent fat above referred to may be employed in the manufacture of leavened bread which represents a very small fraction of the weight of the cotton-seed oil used ordinarily in making up the dough batch. Where the comminuted fat is of a sufficiently fine state of sub-division, and is suitably incorporated with the constituents of the dough batch, as little as 1/20th of the weight of the cotton-seed oil commonly used may be employed. In addition to the material saving in the amount of the shortening agent, the production of a stiffer and springier dough is made possible, the viscosity of the dough being maintained, even though the absorption is increased, and the resultant baked loaf having the desired amount of moisture to give it the freshness and flavor desired.

The novel method of the present invention results in the production of the novel comminuted product described and claimed, together with a method of producing the same by a suitable comminuting operation, in our prior application Serial No. 83,199, filed March 9, 1916.

What we claim is:

1. The method of producing a hard fat of high melting point in a sufficiently fine state of sub-division to permit of homogeneous incorporation with flour and other ingredients of a dough batch, which comprises subjecting the fat to a mechanical grinding operation of a nature adapted to give a fine powder containing particles sufficiently fine to pass through a sieve of about 200 mesh to the square inch, said operation being carried out at a temperature below that of coalescence of the fat particles; substantially as described.

2. The method of producing a hard fat of high melting point in a sufficiently fine state of sub-division to permit of homogeneous incorporation with flour and other ingredients of a dough batch, which comprises subjecting the fat to a mechanical grinding operation in a ball mill at a temperature below that of coalescence of the fat particles, the operation being continued until the fat is reduced to a fine powder containing particles sufficiently fine to pass through a sieve of about 200 mesh to the square inch; substantially as described.

3. The method of producing a hard fat of high melting point in a sufficiently fine state of sub-division to permit of homogeneous incorporation with flour and other ingredients of a dough batch, which comprises subjecting the fat to a mechanical grinding operation of a nature adapted to give a fine powder containing particles sufficiently fine to pass through a sieve of about 200 mesh to the square inch, said operation being carried out at a temperature below that of coalescence of the fat particles, and separating the particles passing through a sieve of about 200 mesh from those of substantially larger size; substantially as described.

4. The method of producing a hard fat of high melting point in a sufficiently fine state of sub-division to permit of homogeneous incorporation with flour and other ingredients of a dough batch, which comprises subjecting the fat to a mechanical grinding operation in a ball mill at a temperature below that of coalescence of the fat particles, the operation being continued until the fat is reduced to a fine powder containing particles sufficiently fine to pass through a sieve of about 200 mesh to the square inch, and separating the particles passing through a sieve of about 200 mesh from those of substantially larger size; substantially as described.

In testimony whereof we affix our signatures.

HENRY A. KOHMAN.
TRUMAN M. GODFREY.
LAUREN H. ASHE.